(12) United States Patent
Suau et al.

(10) Patent No.: US 8,697,797 B2
(45) Date of Patent: Apr. 15, 2014

(54) ASSOCIATIVE ACRYLIC EMULSION CONTAINING AN OXO ALCOHOL-BASED MONOMER, ITS MANUFACTURING METHOD, AND METHOD FOR THICKENING AN AQUEOUS FORMULATION USING THIS EMULSION

(75) Inventors: Jean-Marc Suau, Lucenay (FR); Denis Ruhlmann, Le Clos des Cerisiers (FR)

(73) Assignee: Coatex S.A.S., Genay (FR)

( * ) Notice: Subject to any disclaimer, the term of this patent is extended or adjusted under 35 U.S.C. 154(b) by 292 days.

(21) Appl. No.: 13/036,039

(22) Filed: Feb. 28, 2011

(65) Prior Publication Data

US 2011/0213071 A1 Sep. 1, 2011

Related U.S. Application Data

(60) Provisional application No. 61/311,445, filed on Mar. 8, 2010.

(30) Foreign Application Priority Data

Feb. 26, 2010 (FR) ...................... 10 51368

(51) Int. Cl.
*C08L 31/00* (2006.01)
(52) U.S. Cl.
USPC ....................................... 524/558

(58) Field of Classification Search
USPC ......................................... 524/558
See application file for complete search history.

(56) References Cited

U.S. PATENT DOCUMENTS

| 7,790,800 | B2 | 9/2010 | Suau et al. |
| 2008/0103248 | A1 | 5/2008 | Suau et al. |
| 2011/0065836 | A1 | 3/2011 | Suau et al. |

FOREIGN PATENT DOCUMENTS

| WO | WO 2006/016035 A1 | 2/2006 |
| WO | WO 2006130675 A2 * | 12/2006 |

OTHER PUBLICATIONS

International Search Report issued Jun. 8, 2011, in Patent Application No. PCT/IB2011/000328 (with English translation).
U.S. Appl. No. 13/036,211, filed Feb. 28, 2011, Suau, et al.

* cited by examiner

*Primary Examiner* — Ling Choi
*Assistant Examiner* — Lanee Reuther
(74) *Attorney, Agent, or Firm* — Oblon, Spivak, McClelland, Maier & Neustadt, L.L.P.

(57) ABSTRACT

The present invention pertains to particular HASE rheology modifiers: they are aqueous emulsions whose solids content may reach about 25%, based on acrylic thickeners having an associative monomer functionalized by an oxo alcohol based hydrophobic group. Their method of synthesis, as well as a method for thickening an aqueous formulation containing them, also constitute objectives of the present invention.

20 Claims, No Drawings

ASSOCIATIVE ACRYLIC EMULSION CONTAINING AN OXO ALCOHOL-BASED MONOMER, ITS MANUFACTURING METHOD, AND METHOD FOR THICKENING AN AQUEOUS FORMULATION USING THIS EMULSION

REFERENCE TO PRIOR APPLICATIONS

This application claims priority to U.S. provisional application Ser. No. 61/311,445, filed Mar. 8, 2010; and to French patent application 10 51368, filed Feb. 26, 2010, both incorporated herein by reference.

SUMMARY OF THE INVENTION

The present invention pertains to particular HASE rheology modifiers: they are aqueous emulsions whose solids content may reach about 25%, based on acrylic thickeners having an associative monomer functionalized by an oxo alcohol based hydrophobic group.

One of their features resides in that they are perfectly stable and workable with such a solids content, while being neutralized, i.e. ready for use: once added into the aqueous phase containing a latex and possessing an alkaline nature, they induce an increase in the viscosity, over a large range of shear gradients, and without adding a neutralization agent. This constitutes a major asset compared to the HASEs of the art, which thickened a medium after adding a neutralization agent to it; such an addition was not possible in the emulsion as it was, as it might increase its viscosity to a level that would make it unworkable, and particularly unpumpable.

With the emulsions that are objectives of the present invention, the person skilled in the art currently has products which no longer require later adding a neutralizing agent into the medium to be thickened, whose viscosity as it is makes them perfectly workable by the user for a commercially very beneficial solids content, and with a marked thickening power over a broad range of shear gradients.

Such a result is achieved owing to the particular combination between a change transfer agent used for manufacturing these associative polymers, and oxo alcohols implemented to functionalize the hydrophobic monomer of said polymers. Furthermore, it turns out that these oxo alcohols are very easy to synthesize, and exhibit a significant biodegradability, which constitutes another benefit of the present invention.

A first objective of the invention therefore is HASE emulsions, containing fully or partially neutralized associative acrylic polymers, and whose associative monomer has been functionalized by an oxo alcohol. A second objective of the invention relies on a method for manufacturing such emulsions, particularly by implementing a chain transfer agent during the synthesis of the associative polymer. A third objective of the invention is a method for thickening an aqueous formulation—including a water-based latex paint—from such emulsions.

BACKGROUND OF THE INVENTION

Mastering the rheology of a paint, both during the stage of its manufacture and during its transportation, storage, or implementation currently remains a priority. The diversity of the constraints within each of these steps is due to there being a variety of different rheological behaviors. However, the need of the person skilled in the art may be summarized as achieving the effect of thickening said paint, both for reasons of stability over time and for a possible application onto a vertical surface, the absence of splashing at the time of implementation, etc. This is why additives which contribute to this regulation of the rheological behavior have been designated as thickeners.

Historically, since the 1950s gums and cellulose-based products have been used, whose high molecular weight is one of their essential characteristics. However, these compounds exhibit a certain number of disadvantages, such as their instability over time (see the document U.S. Pat. No. 4,673,518), the need to use a large quantity of them (see the document EP 0,250,943 A 1), or their production costs, particularly in waste processing (see the document U.S. Pat. No. 4,384,096).

Next came so-called "associative" thickeners: these are water-soluble polymers that have insoluble hydrophobic groups. Such macromolecules have an associating nature: once added to water, the hydrophobic groups may assemble into micellar aggregates.

These aggregates are bound to one another by the hydrophilic parts of the polymers: a three-dimensional network is thereby formed, which causes the medium's viscosity to increase. Their operating mechanism and characteristics are currently well-known and described, for example, in the documents "Rheology modifiers for water-borne paints" (Surface Coatings Australia, 1985, pp. 6-10) and "Rheological modifiers for water-based paints: the most flexible tools for your formulations" (Eurocoat 97, UATCM, vol. 1, pp 423-442).

These associative thickeners include the category of HEURs (Hydrophobically modified Ethylene oxide URethane) and HASEs (Hydrophobically modified Alkali-soluble Emulsions). The former designate polymers resulting from the synthesis between a polyalkylene glycol compound, a polyisocyanate, and an alkyl and/or aryl associative monomer made up of a hydrophobic terminal group. The latter designate polymers of (meth)acrylic acid, an ester of these acids and an associative monomer made up of an oxyalkylated chain terminated by a hydrophobic group.

HEURs are the cause of many properties in aqueous paints, particularly as a function of the nature of their associative monomer. The following patent applications filed by the Company COATEX may be cited: EP 0,639,595 A1, which proposes hydrophobic groups having 4 to 36 atoms of carbon to increase the Brookfield™ viscosity, WO 02/102868 A1 which describes the use of polystyrylphenols with more than 40 atoms to increase the viscosity regardless of the shear gradient, and finally EP 1,425,325 A1 which discloses an associative monomer made up of di- and tristyrlphenol, make it possible to achieve an excellent pigment compatibility and a high viscosity at a low and average shear gradient.

However, the HEURs are chemicals which are difficult to dissolve in water, and must be placed in a solution in the presence of solvents or surface active agents, once their % of active ingredients exceeds about 25%. This problem is recounted in the document EP 0 682,094 A1: the proposed solution trivially relies on the use of surface active agents. Additionally, it is noted that HEUR thickeners, highly concentrated and containing surface active agents, had been sold by the company COATEX™ under the names COAPUR™ 5035 and COAPUR™ 6050 before the priority date of this application, and since 1993 for the first ones.

However, the implementation of solvents and surface active agents for formulating the HEUR thickener does not come without a certain number of problems. As a reminder, the solvents are subject to increasingly draconian legislation intended to restrict and even prohibit their use in paints. As for the thickening formulation's surface active agents, they are of such a nature as to destabilize the pains by interacting with the other surface active agents contained within them. Consequently, the formulation of HEURs in water is only possible provided that the polyurethane concentration is drastically limited (about 20% by weight), which makes these thickeners ineffective.

Thus, the person skilled in the art has turned towards HASE thickeners. For these thickeners, the choice of the associative monomer's hydrophobic group is the cause of various rheological properties. To that end, one may cite the following patent applications filed by COATEX™: EP 0,577,526 A 1, which describes of that chain with linear or branched alkyl and/or aryl groups having 26 to 30 carbon atoms, to develop high viscosities at a low shear gradient, and EP 1,778,797 A 1, which describes a branched terminal chain comprising 10 to 24 carbon atoms, to improve pigment compatibility and increase viscosity overall.

These HASE emulsions come in the form of an acid: it is well-known that they increase viscosity after neutralization, at a pH roughly greater than 6, whenever they are placed in the medium that they are intended to thicken. In concrete terms, they are added into this medium and a base is added which neutralizes the carboxylic sites of these emulsions: this triggers the solubilization of the polymer, and therefore the phenomenon of thickening, strengthened by the presence of hydrophobic groups of the associative monomer.

It is possible to neutralize these HASE emulsions first, meaning as they are (or before being added into the medium intended to be thickened) to a pH of around 6: but if this is done, the viscosity of these emulsions increases so much that they are no longer pumpable or workable. This is among the basic knowledge of the person skilled in the art, and is explicitly described in the document EP 0 013,836 A1 (page 4 lines 11-24 and page 8 lines 5-25).

The only exception to this rule concerns emulsions containing HASE polymers with alkylphenols, which can be found in pre-neutralized form, workable and with a solids content of about 25%. Nonetheless, alkylphenols are currently widely suspected of being carcinogenic and hazardous to reproduction; though still tolerated in the paint industry, they are still being watched by legislative institutions in the field, particularly European ones. These products therefore do not constitute a satisfactory response for the person skilled in the art.

DETAILED DESCRIPTION OF THE PREFERRED EMBODIMENTS

Consequently, having a HASE emulsion that is stable and workable with a solids content that may be around 25%, while being neutralized and therefore ready to use, constitutes a very high market demand, but one which has not yet been met. Continuing research in this direction, the inventors have successfully developed a method for manufacturing HASE emulsions that meet these characteristics.

Surprisingly, these emulsions, neutralized to a pH of around 7, exhibit a viscosity compatible with being workable and pumpable, even at a solids content of about 25%. Additionally, they make it possible to effectively thicken an aqueous formulation containing a latex over a broad range of shear gradients, without needing to add a neutralization agent.

A pH of around 7 is achieved by fully or partially neutralizing said emulsion. Additionally, it is indicated that, particularly when an emulsion is only partially neutralized, a neutralization agent may be added afterward into the medium to be thickened, as in the prior art. Unlike in that art, the inventive emulsions then make it possible to reduce the quantity of neutralizing agent added, for an equivalent thickening performance level.

This method is characterized in that it implements the combination of a chain transfer agent during the polymerization reaction, and in that the hydrophobic associative monomer fulfills a particular formula (I) which will be explained in greater detail.

The inventors have particularly demonstrated by numerous tests that, if one of these two conditions is not met (another associative monomer or no chain transfer agent during polymerization), the technical problem that is the objective of the present invention cannot be resolved.

The hydrophobic associative monomer meets the formula (I):

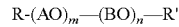

where:
m and n are whole numbers less than 150, at least one of which is nonzero,
A and B designate alkyl groups that are different from one another, and having 2 to 4 carbon atoms, the AO group preferably designating ethylene oxide and the BO group preferably designating propylene oxide,
R designates a polymerizable unsaturated function, preferably methacrylate,
R' being characterized in that it is made up of at least one group with the formula (II):

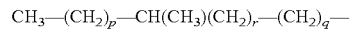

where p and q designate whole numbers, at least one of which is nonzero, where 5<p+q<13, r is a whole number between 0 and 5, preferably equal to 0.

The compounds with the formula (II) constitute the terminal hydrophobic group of the associative monomer with formula (I). This monomer is conventionally manufactured through ethoxylating an alcohol, then functionalizing so as to make it polymerizable. Within the scope of the present invention, the inventors have noted that the particular choice of an oxo alcohol enabled the synthesis of new associative monomers with the formula (I), which ultimately impart all of the properties listed above.

The formula (III) of these oxo alcohols is as follows:

which can also be written:

where p, q, and r have the meanings indicated above for formula II. These are well-known compounds, obtained very simply by hydroformylating an alkene by means of a synthesis gas exhibiting a $H_2/CO$ ratio close to 1. This reaction makes it possible to transform the alkene into an aldehyde, which no longer needs to be hydrogenated for the alcohol to be obtained. One illustration of this is found in the document WO 2007/066036.

Examples of these alcohols are the products sold by the company SASOL™ under the brand names Lial™, Isalchem™, Alchem™, and Safol™, or by the company BASF™ under the brand name Lutensol™.

It is indicated that the terminal group R' of the monomer with formula (I) is made up of at least one group with formula (II)—and not that it is necessarily exclusively made up of that group—because the initial oxo alcohol results from the hydroformylation reaction mentioned above, which may also lead to the formation of linear alcohols. Additionally, in this formula, the value indicated for p+q is the one regarding the majority species, as the commercial oxo alcohols are general mixtures or fractions. Of course, each monomer can have only one chemical formula. It is contemplated herein that compositions, etc. will be made up by including more than one monomer of formula (I).

To date, there are no HASE emulsions with such an associative monomer. Nothing suggested that such emulsions would be both pumpable and workable at a dry solids content of around 25%, while being neutralized at a pH of around 7, meaning that they are ready to use. However, it is very surprising (as it is contrary to the general knowledge of the person skilled in the art, as recounted in the document EP 0 013,836 A1 discussed above) that such emulsions exhibit a low viscosity as-is, while having a high thickening power in the presence of a latex in an aqueous medium. Additionally, it is demonstrated that these emulsions, without adding a neutralization agent, make it possible to thicken an aqueous formulation containing a latex over a broad range of shear rate values. Entirely advantageously, some of these emulsions whose transfer agent rate, implemented for synthesizing the polymer that they contain, was adjusted, exhibit an excellent compromise between their viscosity as-is and their thickening power in the presence of a latex in an aqueous medium.

Thus, a first objective of the invention is a HASE emulsion, comprising water and at least one polymer made up of:
a) (meth)acrylic acid,
b) at least one ester of (meth)acrylic acid,
c) at least one monomer whose formula is (I):

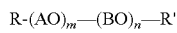
R—(AO)$_m$—(BO)$_n$—R' where:
m and n are whole numbers less than 150, at least one of which is nonzero,
A and B designate alkyl groups that are different from one another, and having 2 to 4 carbon atoms, the AO group preferably designating ethylene oxide and the BO group preferably designating propylene oxide,
R designates a polymerizable unsaturated function, preferably methacrylate,
R' being characterized in that it is made up of at least one group with the formula (II):

CH$_3$—(CH$_2$)$_p$—CH(CH$_2$)$_r$CH$_3$—(CH$_2$)$_q$— which can also be written:

CH$_3$—(CH$_2$)$_p$—CH(CH$_3$)(CH$_2$)$_r$—(CH$_2$)$_q$— where p and q designate whole numbers, at least one of which is nonzero, where 5<p+q<13, r is a whole number between 0 and 5, preferably equal to 0.

These emulsions are further characterized by a preferred embodiment wherein that, for the monomer whose formula is (I), n=0, AO designates ethylene oxide, and m is between 20 and 40.

These emulsions are further characterized in that they may be partially or fully, and preferably fully, neutralized at a pH of between 6 and 10, preferably between 6.5 and 8.5, and in that they may concomitantly exhibit a solids content of between 15% and 20% and a Brookfield™ viscosity measured at 25° C. and at 10 revolutions per minute of less than 50,000 mPa·s.

These emulsions are further characterized by a preferred embodiment wherein the polymer that they contain is made up, expressed as a % by weight of each of its monomers:
a) of 20% to 50%, and preferably 35% to 45%, (meth)acrylic acid,
b) 40% to 70%, and preferably 45% to 55% of at least one ester(meth)acrylic acid,
c) 2% to 20%, and preferably 3% to 15% of at least one monomer with the aforementioned formula (I).

A second objective of the present invention is a method for manufacturing a HASE emulsion, by mixing water and at least one polymer obtained by bringing the following into contact:
a) (meth)acrylic acid,
b) at least one ester of (meth)acrylic acid,
c) at least one monomer with the aforementioned formula (I),
in the presence of at least one chain transfer agent.

This method is further characterized in a preferred embodiment that, for the monomer with formula (I), n=0, AO designates ethylene oxide, and m is between 20 and 40.

This method is further characterized in a preferred embodiment that the dose of chain transfer agents by mass is, compared to the total mass of the monomers involved, between 500 ppm and 10,000 ppm, preferably between 1,500 ppm and 6,000 ppm, and very preferably between 2,000 ppm and 5,000 compared to the total mass of the monomers involved.

This method is further characterized in in a preferred embodiment that the chain transfer agent is chosen from among N-dodecyl mercaptan, N-decyl mercaptan, octyl mercaptan, 1,8-dimercapto-3,6-dioxaoctane (DMDO, CAS #: 14970-87-7), and thiolactic acid.

This method is further characterized in a preferred embodiment that it comprises a later step of total or partial neutralization, preferably total, of the emulsion to a pH between 6 and 10, and preferably between 6.5 and 8.5.

This method is further characterized in a preferred embodiment that the emulsions exhibit a solids content of between 15% and 20% and a Brookfield viscosity measured at 25° C. and at 10 revolutions per minute below 50,000 mPa·s.

This method is further characterized in a preferred embodiment that said polymer contained within the emulsions is made up, expressed as a % by weight of each of its monomers:
a) of 20% to 50%, and preferably 35% to 45%, (meth)acrylic acid,
b) 40% to 70%, and preferably 45% to 55% of at least one ester(meth)acrylic acid,
c) 2% to 20%, and preferably 3% to 15% of at least one monomer with the aforementioned formula (I).

A third objective of the present invention is a method for thickening an aqueous formulation containing a latex, by adding into said formulation an aforementioned HASE emulsion whose pH is between 6 and 10, preferably between 6.5 and 8.5, potentially adding a neutralization agent into said formulation.

This method is further characterized in a preferred embodiment that said formulation is a water-based paint.

EXAMPLES

Each of the tests starts by creating a polymer emulsion by mixing water and a polymer. The composition of each polymer is given afterward (in particular, see the data in Table 1).

Each emulsion is fully neutralized at a pH of 7, with a sodium hydroxide solution. For each emulsion, depending on its solids content of polymer, its Brookfield™ viscosity is measured at 10 revolutions per minute (Table 2) and at 25° C.

For some of these emulsions which prove to be workable with a high solids content (e.g., a Brookfield™ viscosity value at 10 revolutions per minute below 50,000 mPa·s for a solids content of 20%) a thickener efficiency test is carried out on a binder (Table 3). To do so, a certain dose of the neutralized emulsion is added to an aqueous solution of acrylic binder. All the tests are carried out so that there are 50 grams of an emulsion fully preneutralized to pH=7, and with a solids content equal to 20% by solids content of polymer and 175 grams of a Neocryl™ XK 90 acrylic binder sold by the company DSM™.

Test #1

This test illustrates the art, does not implement a chain transfer agent, and concerns an aqueous emulsion of a polymer made up of, as a % by weight of each of its monomers:
a) 35.5% methacrylic acid,
b) 52.5% ethyl acrylate,
c) 50% of a monomer with formula (I) wherein m=30, n=0, AO designates ethylene oxide, R designates the methacrylate function, R' designates the group with the formula (II) where p+q=9 (designated by the term oxo $C_{12}EO_{30}$).

This polymer was obtained by putting all of the aforementioned monomers in contact in a reactive medium, i.e. water. Its synthesis corresponds to that described in tests #2 to #7 but without implementing a chain transfer agent.

Tests #2 to #7

These tests illustrate the invention, and implement an increasing dose of a chain transfer agent that is dodecyl mercaptan, and relate to aqueous emulsions of a polymer made up, as a % by weight of each of its monomers:
a) 35.5% methacrylic acid,
b) 52.5% ethyl acrylate,
c) 12% of a monomer with formula (I) wherein m=30, n=0, AO designates ethylene oxide, R designates the methacrylate function, R' designates the group with the formula (II) where p+q=9 (designated by the term oxo $C_{12}EO_{30}$).

This polymer was obtained by putting all of the aforementioned monomers in contact in a reactive medium, i.e. water, in the presence of a certain quantity of chain transfer agent, i.e. dodecyl mercaptan.

In concrete terms, to synthesize the polymer in the presence of 560 ppm of mercaptan (test #2), start by weighing into a 1 liter reactor 409 grams of bipermutated water and 5.6 grams of sodium dodecyl sulfate. It is heated in the starter to 82° C.±2° C.

During this time, a pre-emulsion is prepared, weighing into a beaker:
116.8 grams of bipermutated water,
1.96 grams of sodium dodecyl sulfate,
0.139 grams of dodecyl mercaptan, i.e. 556 ppm of mercaptan compared to the mass of all the involved monomers
88.84 grams of methacrylic acid,
131.1 grams of ethyl acrylate,
30.0 grams of macromonomer;

Next, 0.8 grams of ammonium persulfate diluted in 6 grams of bipermutated water are weighed out for the first catalyst, and 0.08 grams of sodium metabisulfite diluted in 4 grams of bipermutated water are weighed out for the second catalyst. When the starter is at the right temperature, the two catalysts are added, and polymerization is performed for 2 hours at 84° C.+2° C., adding the pre-emulsion at the same time. The pump is rinsed with 20 grams of bipermutated water and it is cooked for 1 hour at 84° C.±2° C. Finally, it is cooled to room temperature and filtered.

The syntheses corresponding to tests #3 to #7 are carried out in a similar fashion, by adjusting the dose of mercaptan.

Observations

It is observed that only the tests implementing both the particular oxo alcohol based monomer and the chain transfer agent lead to low Brookfield™ viscosity values, even at a solids content of 25% (Table 2).

Additionally, each of these fully pre-neutralized emulsions can be used to effectively thicken the solution of acrylic binder (Table 3). The best results are particularly obtained using emulsions of tests #5 and #6 which, though having a Brookfield™ viscosity of 10 revolutions per minute below 20,000 mPa·s for a solids content equal to 25%, nonetheless lead to a significant thickening, regardless of the shear gradient. The result is therefore preneutralized HASE emulsions, which are stable and workable for a solids content having a commercial benefit, free of nonylphenols, and with the ability to advantageously thicken a latex in an aqueous solution.

Test #8

This test illustrates the invention. It particularly implements an associative monomer different from the one used above (methacryl-urethane bond).

It implements a certain quantity of a chain transfer agent which is dodecyl mercaptan, and relate to an aqueous emulsion of a polymer made up of, as a % by weight of each of its monomers:
a) 35.5% methacrylic acid,
b) 52.5% ethyl acrylate,
c) 12% of a monomer with formula (I) wherein m=30, n=0, AO designates ethylene oxide, R designates the methacryl-urethane function, R' designates the group with the formula (II) where p+q=9 (designated by the term oxo $C_{12}EO_{30}$).

This polymer was obtained by putting all of the aforementioned monomers in contact in a reactive medium, i.e. water, using the same procedure as described above.

Tests #9 to #10

This test illustrates the invention. It particularly implements an associative monomer different from the one used in the previous tests (similar to the one used in tests #2 to #7, but oxyethylated 25 times, the % of the associative monomer here being 10 and 15%)

They implement a certain quantity of a chain transfer agent which is dodecyl mercaptan, and relate to an aqueous emulsion of a polymer made up of, as a % by weight of each of its monomers:
a) 33.5% and 37.5% methacrylic acid (tests 9 and 10),
b) 52.5% ethyl acrylate,
c) 10.0% and 15.0% of a monomer with the formula (I) wherein (tests #9 and 10)
m=25, n=0, AO designates ethylene oxide, R designates the methacrylate function,
R' designates the group with the formula (II) where p+q=9 (designated by the term oxo $C_{12}EO_{25}$).

This polymer was obtained by putting all of the aforementioned monomers in contact in a reactive medium, i.e. water, using the same procedure as described above.

Observations

The results according to tests 8 to 10 corroborate those obtained according to tests #2 to #7. Low Brookfield™ viscosity values are observed.

The result is therefore preneutralized HASE emulsions, which are stable and workable for a solids content having a commercial benefit, free of nonylphenols, and with the ability to advantageously thicken a latex in an aqueous solution.

Tests #11 to 15

These tests illustrate domains outside the invention. They particularly implement an associative monomer different from the one used in the previous tests, and free of nonylphenols. They implement (tests 13 to 15) or don't implement (tests 11 and 12) 2110 ppm of a chain transfer agent, to wit dodecyl mercaptan.

They pertain to an aqueous emulsion of a polymer made up, as a % by weight of each of its monomers:
  a) 35.5% methacrylic acid,
  b) 52.5% ethyl acrylate,
  c) 12.5% of a monomer that is:
a monomer with the formula (I) wherein m=36, n=0, AO designates ethylene oxide, R designates the methacrylate function, R' designates 2-hexyl 1-dodecanyl for test #11 (designated by the term iso $C_{20}EO_{36}$);
a monomer with the formula (I) wherein m=25, n=0, AO designates ethylene oxide, R designates the methacrylate function, R' designates a linear alkyl group having 12 carbon atoms for test #12 (designated by the term $C_{12}EO_{25}$);
the same monomer as the one according to test #11 for test #13;
a monomer with the formula (I) wherein m=23, n=0, AO designates ethylene oxide, R designates the methacrylate function, R' designates a linear alkyl group having 12 carbon atoms for test #14;
the same monomer as the one according to test #14 for test #15; this particular test implements 5,600 ppm of mercaptan.

These polymers were obtained by putting all of the aforementioned monomers in contact in a reactive medium, i.e. water, using the same procedure as described above.

Observations

It is observed according to tests #11 to 15 that choosing a monomer outside the invention, or choosing not to use a chain transfer agent, leads to Brookfield™ viscosities 10 revolutions per minute which very quickly rise as a function of solids content. Therefore, none of these emulsions is suitable for pre-neutralization, as they may be too viscous.

By comparison, between tests #7 and 15 which implement the greatest quantity of chain transfer agents (5,600 ppm), must better results obtained with the inventive emulsion in terms of rheology as it is are observed.

As tests #11 to 15 do not lead to preneutralized emulsions workable as they are at a solids content of 20%, they could not be tested on the acrylic binder.

Test #16

This test illustrates a domain outside the invention and implements an emulsion of a HASE polymer sold by the company COATEX™ under the name Rheotech™ 2100, which contains nonylphenols.

Observations

Very low Brookfield™ viscosity values are observed at 10 revolutions per minute, even at 25% solids content, as well as a marked thickening power on the latex binder, regardless of the shear gradient.

Nonetheless, this emulsion contains nonylphenols.

Tests #17 to #18

These tests illustrate a domain outside the invention, and implement an emulsion of a HASE polymer sold under the names Acrysol™ TT 615 and Acrysol™ TT 935 by the company ROHM & HAAS™, which do not contain the particular monomer of the present invention.

Observations

None of these emulsions is satisfactory in terms of viscosity as-is, the Brookfield™ viscosity values at 10 revolutions per minute being extremely high, even with a solids content of 10%. They were not tested on the acrylic binder.

TABLE 1

| Test no. | IN/OI | Associative monomer | Dose of transfer agent (ppm/total mass of monomers) |
|---|---|---|---|
| 1 | OI | oxo $C_{12}EO_{30}$ | 0 |
| 2 | IN | oxo $C_{12}EO_{30}$ | 560 |
| 3 | IN | oxo $C_{12}EO_{30}$ | 1390 |
| 4 | IN | oxo $C_{12}EO_{30}$ | 1,800 |
| 5 | IN | oxo $C_{12}EO_{30}$ | 2840 |
| 6 | IN | oxo $C_{12}EO_{30}$ | 4150 |
| 7 | IN | oxo $C_{12}EO_{30}$ | 5600 |
| 8 | IN | maeg TDI oxo $C_{12}EO_{30}$ | 1390 |
| 9 | IN | oxo $C_{12}EO_{25}$ (10% monomer) | 2840 |
| 10 | IN | oxo $C_{12}EO_{25}$ (15% monomer) | 2840 |
| 11 | OI | iso $C_{20}EO_{36}$ | 0 |
| 12 | OI | $C_{22}EO_{25}$ | 0 |
| 13 | OI | iso $C_{16}EO_{25}$ | 2110 |
| 14 | OI | $C_{12}EO_{23}$ | 2110 |
| 15 | OI | $C_{12}EO_{23}$ | 5,600 |

IN = invention
OI = outside invention

TABLE 2

| Test no. | IN/OI | Bk10 10% | Bk10 15% | Bk10 20% | Bk10 25% |
|---|---|---|---|---|---|
| 1 | OI | 20,500 | >$10^5$ | >$10^5$ | Not measurable |
| 2 | IN | 20,500 | 24,000 | 46,000 | 120,000 |
| 3 | IN | 18,000 | 22,000 | 36,800 | 80,000 |
| 4 | IN | 9,000 | Not measured | 21,000 | 42,000 |
| 5 | IN | 3,500 | 8,500 | 12,400 | 17,400 |
| 6 | IN | Not measured | 5,500 | 10,500 | 14,200 |
| 7 | IN | Not measured | 3,500 | 8,300 | 10,700 |
| 8 | IN | 7,000 | 18,400 | 32,400 | Not measured |
| 9 | IN | Not measured | | 11,200 | |
| 10 | IN | | | 13,800 | |
| 11 | OI | >$10^5$ | | Not measurable | |
| 12 | OI | >$10^5$ | | | |
| 13 | OI | >$10^5$ | | | |
| 14 | OI | 52,000 | | | |
| 15 | OI | 11,000 | 22,600 | 52,000 | >$10^5$ |
| 16 | OI | 500 | Not measured | 2,600 | 5,700 |
| 17 | OI | >$10^5$ | | Not measurable | |
| 18 | OI | >$10^5$ | | | |

TABLE 3

| Test no. | IN/OI | Bk10 | Bk100 | Stormer | ICI |
|---|---|---|---|---|---|
| 2 | IN | 5,480 | 2,540 | 102 | 2.4 |
| 3 | IN | 2,320 | 1,360 | 87 | 2 |
| 4 | IN | 1,360 | 900 | 77 | 2 |
| 5 | IN | 1,320 | 840 | 75 | 1.8 |
| 6 | IN | 880 | 610 | 68 | 1.5 |
| 7 | IN | 760 | 530 | 66 | 1.3 |
| 16 | OI | 4,120 | 2,940 | 113 | 2.3 |

In view of this final table, it is observed that the inventive emulsions enable the formulator to obtain a palette of highly varied rheological behaviors.

That said, the best compromise between thickening efficiency in general, and the workability of the emulsion, is obtained for tests #4, 5, and 6.

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more."

The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A hydrophobically modified alkali soluble emulsion (HASE) emulsion, comprising:
water and
a polymer comprising, in polymerized form:
a) (meth)acrylic acid,
b) at least one ester of (meth)acrylic acid, and
c) at least one monomer according to formula (I):

$$R-(AO)_m-(BO)_n-R' \qquad (I)$$

wherein
m is an integer between 20 and 40,
n is a whole number less than 150,
A is ethylene and
B is an alkylene group having 3 to 4 carbon atoms,
R designates a polymerizable unsaturated function, and
R' is a mixture comprising a C9 to C20 linear alkyl group and a branched alkyl group of formula (II):

$$CH_3-(CH_2)_p-CH(CH_3)(CH_2)_r-(CH_2)_q- \qquad (II)$$

where p and q designate whole numbers, at least one of which is nonzero, such that 5<p+q<13, and r is a whole number between 0 and 5.

2. The HASE emulsion according to claim 1, wherein n=0.

3. The HASE emulsion according to claim 1,
wherein
the polymer is partially or fully neutralized at a pH of 6-10,
a solids content of the emulsion is from 15%-20% and
a Brookfield™ viscosity of the emulsion measured at 25° C. and at 10 revolutions per minute is less than 50,000 mPa·s.

4. The HASE emulsion according to claim 3, wherein the polymer is fully neutralized.

5. A method for thickening an aqueous formulation comprising a latex, the method comprising combining said formulation and a HASE emulsion according to claim 3, and optionally adding a neutralization agent.

6. The method as claimed in claim 5, wherein said formulation is a water-based paint.

7. The HASE emulsion according to claim 1, wherein the polymer comprises, in polymerized form:
a) of 20% to 50% by weight of (meth)acrylic acid,
b) 40% to 70% by weight of at least one ester of (meth)acrylic acid, and
c) 2% to 20% of at least one monomer of formula (I).

8. The HASE emulsion according to claim 1, wherein the polymer comprises, in polymerized form:
35% to 45% by weight of (meth)acrylic acid,
45% to 55% by weight of at least one ester of (meth)acrylic acid, and
3% to 15% by weight of at least one monomer of formula (I).

9. The HASE emulsion as claimed in claim 1, wherein BO is $-(CH_2-CH(CH_3)-O)-$, R is methacrylate, and r is equal to 0.

10. The HASE emulsion according to claim 1, wherein
the polymer is fully neutralized at a pH of 6.5-8.5,
a solids content of the emulsion is between 15% and 20% by weight, and
a Brookfield™ viscosity of the emulsion measured at 25° C. and at 10 revolutions per minute is less than 50,000 mPa·s.

11. A method for manufacturing a HASE emulsion, comprising forming an emulsion comprising water and at least one polymer comprising, in polymerized form:
a) (meth)acrylic acid,
b) at least one ester of (meth)acrylic acid,
d) at least one monomer of formula (I):

$$R-(AO)_m-(BO)_n-R' \qquad (I)$$

wherein
m and n are each independently whole numbers less than 150, at least one of which is nonzero,
A and B are each independently alkylene groups of 2 to 4 carbon atoms,
R is a polymerizable unsaturated function, and
R' is a mixture comprising a C9 to C20 linear alkyl group and a branched alkyl group of formula (II):

$$CH_3-(CH_2)_p-CH(CH_3)(CH_2)_r-(CH_2)_q-$$

where p and q designate whole numbers, at least one of which is nonzero, where 5<p+q<13, and r is a whole number between 0 and 5; wherein the polymerization is conducted
in the presence of at least one chain transfer agent.

12. The method according to claim 11, wherein n=0, AO designates ethylene oxide, and m is 20-40.

13. The method according to claim 11, wherein an amount of chain transfer agent by mass is, compared to the total mass of the monomers, 500 ppm to 10,000 ppm.

14. The method according to claim 13, wherein the amount of chain transfer agent is, 1,500 ppm to 6,000 ppm.

15. The method according to claim 13, wherein the amount of chain transfer agent by mass is 2,000 ppm to 5,000.

16. The method according to claim 11, wherein the chain transfer agent is selected from the group consisting of N-dodecyl mercaptan, N-decyl mercaptan, octyl mercaptan, 1,8-dimercapto-3,6-dioxaoctane, and thiolactic acid.

17. The method according to claim 11, further comprising total or partial neutralization, of the emulsion to a pH of 6-10.

18. The method according to claim 11, further comprising total neutralization of the emulsion to a pH of 6-10.

19. The method according to claim 11, wherein a solids content of the emulsion is from 15%-20% and a Brookfield viscosity measured at 25° C. and at 10 revolutions per minute is below 50,000 mPa·s.

20. The method according to claim 11, wherein said polymer comprises, in polymerized form, expressed as a % by weight of each of its monomers 35% to 45% (meth)acrylic acid, 45% to 55% of at least one ester of (meth)acrylic acid, and 3% to 15% of at least one monomer with the formula (I).

* * * * *